United States Patent
Tanaka

(10) Patent No.: US 11,457,293 B2
(45) Date of Patent: Sep. 27, 2022

(54) WIRELESS COMMUNICATION DEVICE, CONTROL PROGRAM AND CONTROL METHOD

(71) Applicant: SUMITOMO ELECTRIC INDUSTRIES, LTD., Osaka (JP)

(72) Inventor: Yoshizo Tanaka, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 446 days.

(21) Appl. No.: 16/471,826

(22) PCT Filed: Oct. 11, 2017

(86) PCT No.: PCT/JP2017/036841
§ 371 (c)(1),
(2) Date: Jun. 20, 2019

(87) PCT Pub. No.: WO2018/128000
PCT Pub. Date: Jul. 12, 2018

(65) Prior Publication Data
US 2020/0100001 A1    Mar. 26, 2020

(30) Foreign Application Priority Data
Jan. 6, 2017  (JP) .............................. JP2017-001345

(51) Int. Cl.
*G06F 13/24* (2006.01)
*H04Q 9/02* (2006.01)
*G05B 23/02* (2006.01)

(52) U.S. Cl.
CPC ............. *H04Q 9/02* (2013.01); *G05B 23/024* (2013.01); *G05B 23/0272* (2013.01); *G06F 13/24* (2013.01); *H04Q 2209/40* (2013.01)

(58) Field of Classification Search
CPC .......... G06F 13/00; G06F 13/24; H04Q 9/02; H04Q 2209/40; G04B 23/024; G05B 23/0272
See application file for complete search history.

(56) References Cited

U.S. PATENT DOCUMENTS

| 2005/0143058 A1* | 6/2005 | Chang | G06F 9/4825 |
| | | | 455/418 |
| 2007/0103324 A1* | 5/2007 | Kosuge | G08B 21/20 |
| | | | 340/618 |

(Continued)

FOREIGN PATENT DOCUMENTS

| JP | 2003-16566 A | 1/2003 |
| JP | 2006-163517 A | 6/2006 |
| JP | 2008-59302 A | 3/2008 |

*Primary Examiner* — Henry Tsai
*Assistant Examiner* — Kim T Huynh
(74) *Attorney, Agent, or Firm* — Faegre Drinker Biddle & Reath LLP

(57) ABSTRACT

This wireless communication device includes: a wireless communication unit of which operation is allowed to be activated and stopped; a determination unit configured to determine whether or not a measurement result by a sensor satisfies a predetermined condition; and a controller configured to perform control of, when the determination unit has determined that the predetermined condition has been satisfied, activating the wireless communication unit of which operation has been stopped, and causing the wireless communication unit to transmit the measurement result or a determination result by the determination unit.

7 Claims, 9 Drawing Sheets

(56) References Cited

U.S. PATENT DOCUMENTS

| | | | |
|---|---|---|---|
| 2008/0022140 A1* | 1/2008 | Yamada | G06F 1/3237 |
| | | | 713/300 |
| 2010/0042866 A1* | 2/2010 | Shih | G06F 1/12 |
| | | | 713/600 |
| 2010/0271199 A1* | 10/2010 | Belov | G01M 5/00 |
| | | | 340/539.3 |
| 2012/0002605 A1* | 1/2012 | Yoshino | H04W 52/0229 |
| | | | 370/328 |
| 2015/0149803 A1* | 5/2015 | Takahashi | G06F 13/24 |
| | | | 713/323 |
| 2016/0105847 A1* | 4/2016 | Smith | H04L 67/125 |
| | | | 370/252 |

* cited by examiner

WIRELESS COMMUNICATION DEVICE, CONTROL PROGRAM AND CONTROL METHOD

TECHNICAL FIELD

The present invention relates to a wireless communication device, a control program, and a control method.

This application claims priority on Japanese Patent Application No. 2017-001345 filed on Jan. 6, 2017, the entire content of which is incorporated herein by reference.

BACKGROUND ART

Japanese Laid-Open Patent Publication No. 2006-163517 (PATENT LITERATURE 1) describes the following abnormality detection device. That is, the abnormality detection device is an abnormality detection device having: a detection means provided to a monitor target; and a calculation means which diagnoses the state of the monitor target through a neural network on the basis of detection data from the detection means, wherein the calculation means forms a model of the neural network by use of a predetermined model creation data, diagnoses the state of the monitor target on the basis of the detection data by use of the model of the neural network, adds as an intermediate layer an input vector based on the detection data at a predetermined time point to update the model of the neural network, and after the update, diagnoses the state of the monitor target by use of the updated model of the neural network.

CITATION LIST

Patent Literature

PATENT LITERATURE 1: Japanese Laid-Open Patent Publication No. 2006-163517

SUMMARY OF INVENTION

Solution to Problem (1) A wireless communication device of the present disclosure includes: a wireless communication unit of which operation is allowed to be activated and stopped; a determination unit configured to determine whether or not a measurement result by a sensor satisfies a predetermined condition; and a controller configured to perform control of, when the determination unit has determined that the predetermined condition has been satisfied, activating the wireless communication unit of which operation has been stopped, and causing the wireless communication unit to transmit the measurement result or a determination result by the determination unit.

(8) A control program of the present disclosure is to be used in a wireless communication device, and is configured to cause a computer to function as: a wireless communication unit of which operation is allowed to be activated and stopped; a determination unit configured to determine whether or not a measurement result by a sensor satisfies a predetermined condition; and a controller configured to perform control of, when the determination unit has determined that the predetermined condition has been satisfied, activating the wireless communication unit of which operation has been stopped, and causing the wireless communication unit to transmit the measurement result or a determination result by the determination unit.

(9) A control method of the present disclosure is to be performed in a wireless communication device including a wireless communication unit of which operation is allowed to be activated and stopped. The control method includes: a step of determining whether or not a measurement result by a sensor satisfies a predetermined condition; and a step of performing control of, when having determined that the predetermined condition has been satisfied, activating the wireless communication unit of which operation has been stopped, and causing the wireless communication unit to transmit the measurement result or a determination result.

One aspect of the present disclosure can be realized not only as a wireless communication device including such a characteristic processing unit, and but also as a control method including steps of such characteristic processes. One aspect of the present disclosure can be realized as a semiconductor integrated circuit that realizes part or the entirety of the wireless communication device, or can be realized as a communication system that includes the wireless communication device.

DESCRIPTION OF EMBODIMENTS

Figure 1:
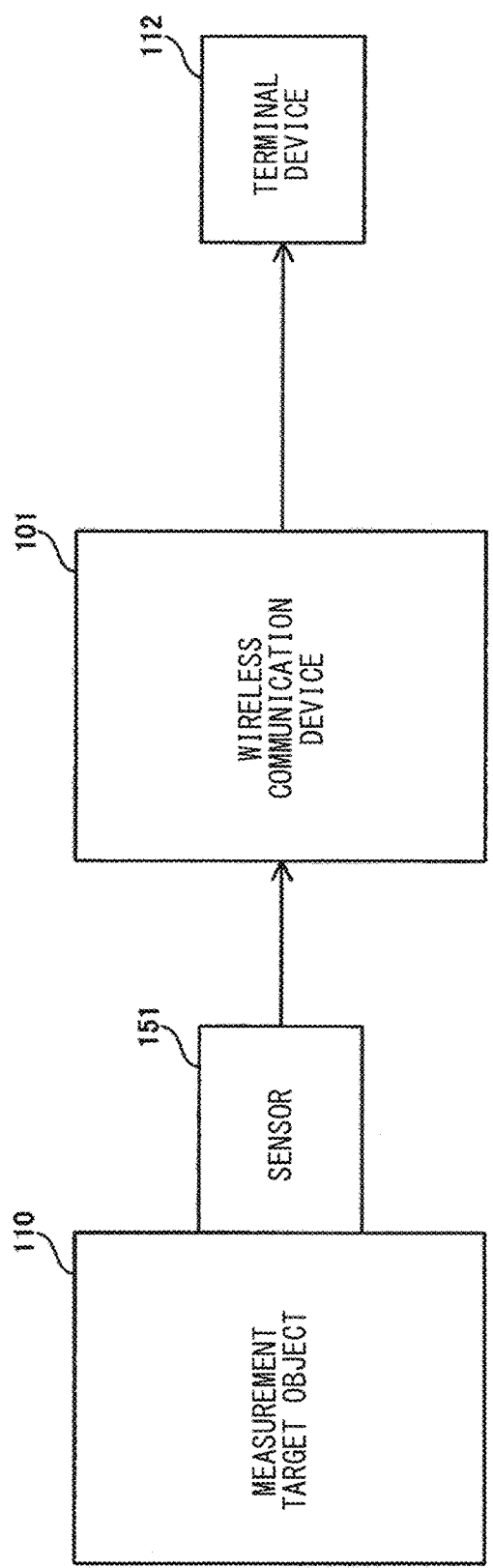
FIG. 1 is a diagram showing a configuration of a communication system according to a first embodiment of the present disclosure.

Conventionally, devices for monitoring facilities and the like provided in plants have been developed.

Problems to be Solved by the Present Disclosure

According to the device as in PATENT LITERATURE 1 described above, an abnormality that has occurred in a facility can be detected, without using manpower. Meanwhile, in order to avoid reconfiguration and the like of production lines in a plant, it is desirable that such a device can perform wireless communication. Further, for similar reasons, a battery-operated-type device that requires no power source line is desirable.

However, if abnormality detection is always performed, power consumption is increased. Thus, it is conceivable to provide a standby time for the device in order to extend the life of the battery. However, in this case, there is a possibility that an instantaneous change in the state of the measurement target cannot be detected.

The present disclosure has been made in order to solve the problem described above. An object of the present disclosure is to provide a wireless communication device, a control program, and a control method that can suppress power consumption and that can detect an instantaneous change in a measurement target.

Effect of the Disclosure

According to the present disclosure, power consumption can be suppressed and an instantaneous change in a measurement target can be detected.

DESCRIPTION OF EMBODIMENTS OF THE PRESENT DISCLOSURE

First, contents of embodiments of the present disclosure are listed and described.

(1) A wireless communication device according to an embodiment of the present disclosure includes: a wireless communication unit of which operation is allowed to be activated and stopped; a determination unit configured to determine whether or not a measurement result by a sensor satisfies a predetermined condition; and a controller configured to perform control of, when the determination unit has determined that the predetermined condition has been satisfied, activating the wireless communication unit of which operation has been stopped, and causing the wireless communication unit to transmit the measurement result or a determination result by the determination unit.

According to this configuration, until the measurement result satisfies the predetermined condition, operation of the wireless communication unit can be stopped. Thus, power consumption can be suppressed and the life of the battery can be extended. Since the function of determining whether or not the measurement result satisfies the predetermined condition is always operated, a change that has occurred in the measurement target can be detected also in a state where the operation of the wireless communication unit is stopped. Therefore, power consumption can be suppressed and an instantaneous change in the measurement target can be detected.

(2) Preferably, the controller includes a determination detection unit configured to receive the determination result from the determination unit, and an acquisition unit of which operation is allowed to be activated and stopped, and when the determination detection unit has received the determination result indicating that the predetermined condition has been satisfied, the acquisition unit of which operation has been stopped is activated and acquires the measurement result.

According to this configuration, also inside the controller, until the measurement result satisfies the predetermined condition, the function for acquiring the measurement result can be stopped. Thus, power consumption can be further suppressed.

(3) Preferably, the controller further performs control of periodically activating the wireless communication unit of which operation has been stopped, and causing the wireless communication unit to transmit information.

According to this configuration, for example, even in a case where a measurement result is not transmitted for a long period because no abnormality occurs in the measurement target, whether or not the wireless communication device is operating normally can be confirmed by the administrator or the like periodically receiving the information.

(4) More preferably, the information is the measurement result that has satisfied the predetermined condition.

According to this configuration, the measurement result that has satisfied the predetermined condition is repeatedly transmitted. Therefore, while enabling confirmation on whether or not the wireless communication device is operating normally, it is possible to assuredly perform notification of the measurement result that satisfies the predetermined condition.

(5) More preferably, the information is a most recent measurement result.

According to this configuration, while enabling confirmation on whether or not the wireless communication device is operating normally, it is possible for the administrator or the like to periodically confirm the state of the measurement target.

(6) More preferably, the information is data of a fixed value.

According to this configuration, until the measurement result satisfies the predetermined condition, the function for acquiring the measurement result can be stopped. Thus, while enabling confirmation on whether or not the wireless communication device is operating normally, it is possible to suppress increase in power consumption.

(7) Preferably, the wireless communication unit, the determination unit, and the controller each operate by being supplied with power from a battery.

This configuration requires no power source line, and thus, when the wireless communication device is to be installed in a plant or the like, reconfiguration or the like of production lines can be avoided.

(8) A control program according to an embodiment of the present disclosure is to be used in a wireless communication device, and is configured to cause a computer to function as: a wireless communication unit of which operation is allowed to be activated and stopped; a determination unit configured to determine whether or not a measurement result by a sensor satisfies a predetermined condition; and a controller configured to perform control of, when the determination unit has determined that the predetermined condition has been satisfied, activating the wireless communication unit of which operation has been stopped, and causing the wireless communication unit to transmit the measurement result or a determination result by the determination unit.

According to this configuration, until the measurement result satisfies the predetermined condition, operation of the wireless communication unit can be stopped. Thus, power consumption can be suppressed and the life of the battery can be extended. Since the function of determining whether or not the measurement result satisfies the predetermined condition is always operated, a change that has occurred in the measurement target can be detected also in a state where the operation of the wireless communication unit is stopped.

Therefore, power consumption can be suppressed and an instantaneous change in the measurement target can be detected.

(9) A control method according to an embodiment of the present disclosure is to be performed in a wireless communication device including a wireless communication unit of which operation is allowed to be activated and stopped. The control method includes: a step of determining whether or not a measurement result by a sensor satisfies a predetermined condition; and a step of performing control of, when having determined that the predetermined condition has been satisfied, activating the wireless communication unit of which operation has been stopped, and causing the wireless communication unit to transmit the measurement result or a determination result.

According to this method, until the measurement result satisfies the predetermined condition, operation of the wireless communication unit can be stopped. Thus, power consumption can be suppressed and the life of the battery can be extended. Since the function of determining whether or not the measurement result satisfies the predetermined condition is always operated, a change that has occurred in the measurement target can be detected also in a state where the operation of the wireless communication unit is stopped. Therefore, power consumption can be suppressed and an instantaneous change in the measurement target can be detected.

In the following, embodiments of the present disclosure will be described with reference to the drawings. In the drawings, the same or corresponding parts are denoted by the same reference signs, and will not be repeatedly described. At least some parts of the embodiments described below may be combined as desired.

First Embodiment

Configuration and Basic Operation

Communication System

FIG. 1 is a diagram showing a configuration of a communication system according to a first embodiment of the present disclosure.

With reference to FIG. 1, a communication system 201 includes a wireless communication device 101 and a sensor 151.

The sensor 151 is provided at a measurement target object 110 such as a facility in a plant, for example, and periodically or not periodically measures the value of a current flowing in the measurement target object 110, vibration of the measurement target object 110, the temperature of the measurement target object 110, or the like. Then, the sensor 151 transmits measurement information indicating a measurement result, to the wireless communication device 101.

The wireless communication device 101 receives the measurement information transmitted from the sensor 151, and determines, for example, whether or not an abnormality has occurred in the measurement target object 110, on the basis of the measurement result indicated by the received measurement information. When the wireless communication device 101 has determined that an abnormality has occurred in the measurement target object 110, the wireless communication device 101 transmits report information X indicating the measurement result, to a terminal device 112 or the like of an administrator.

Wireless Communication Device

Figure 2:
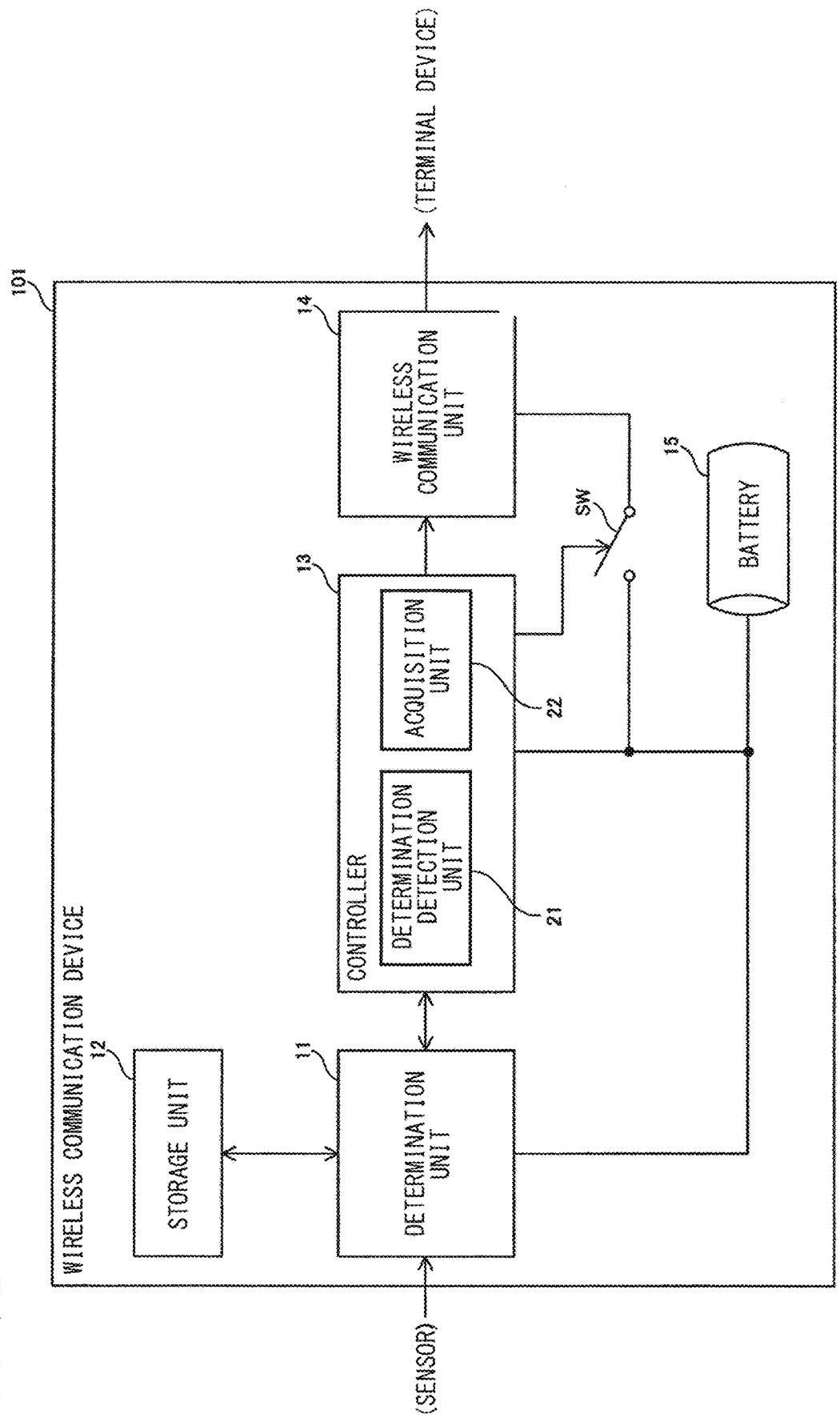
FIG. 2 is a diagram showing a configuration of a wireless communication device according to the first embodiment of the present disclosure.

FIG. 2 is a diagram showing a configuration of a wireless communication device according to the first embodiment of the present disclosure.

With reference to FIG. 2, the wireless communication device 101 includes a determination unit 11, a storage unit 12, a controller 13, a wireless communication unit 14, a battery 15, and a switch SW. The controller 13 includes a determination detection unit 21 and an acquisition unit 22. The determination unit 11 and the controller 13 are realized by separate semiconductor integrated circuits such as a CPU (Central Processing Unit) and a DSP (Digital Signal Processor), for example.

The battery 15 supplies power to each circuit in the wireless communication device 101. The switch SW is connected between the battery 15 and the wireless communication unit 14, and the initial state of the switch SW is set to OFF. Therefore, in the initial state, the power supply line from the battery 15 to the wireless communication unit 14 is disconnected, and the operation of the wireless communication unit 14 is stopped without power being supplied from the battery 15.

The determination unit 11 always operates in a state where the power source of the wireless communication device 101 is ON. When the determination unit 11 has received measurement information transmitted from the sensor 151, the determination unit 11 determines whether or not the measurement result indicated by the measurement information satisfies a predetermined condition.

For example, the storage unit 12 has stored therein a threshold Th for measurement results, the threshold Th being previously set by the administrator. When the measurement result indicated by the received measurement information exceeds the threshold Th, the determination unit 11 determines that the measurement result satisfies the predetermined condition. Then, the determination unit 11 outputs, as the determination result, an interrupt signal indicating that the measurement result satisfies the predetermined condition, to the controller 13.

When the power source of the wireless communication device 101 is turned on, the controller 13 shifts to a sleep mode as the initial state. In the sleep mode, the controller 13 allows only the function of receiving an interrupt signal from outside to be effective, and nullifies the other functions.

When the controller 13 has received an interrupt signal from the determination unit 11 in the sleep mode, the controller 13 shifts from the sleep mode to an active mode. In the active mode, the controller 13 performs control of causing report information X indicating the measurement result to be transmitted from the wireless communication unit 14.

More specifically, the determination detection unit 21 and the acquisition unit 22 in the controller 13 are realized by circuit portions different from each other. The determination detection unit 21 is a circuit portion that receives the interrupt signal from outside, and always operates. The operation of the acquisition unit 22 is stopped in a state where the controller 13 is in the sleep mode.

When the determination detection unit 21 has received the interrupt signal from the determination unit 11, the determination detection unit 21 causes the controller 13 to shift from the sleep mode to the active mode, thereby activating the acquisition unit 22 of which operation has been stopped.

In addition, when the determination detection unit 21 has received the interrupt signal from the determination unit 11, the determination detection unit 21 outputs, to the switch SW, a control signal for switching the switch SW from OFF to ON, thereby activating the wireless communication unit 14 of which operation has been stopped.

After having been activated, the acquisition unit 22 requests the determination unit 11 for notification of the most recent measurement result, i.e., the measurement result that has been determined as satisfying the predetermined condition. Then, the acquisition unit 22 notifies the wireless communication unit 14 of the measurement result having been notified of from the determination unit 11.

When the wireless communication unit 14 has been notified of the measurement result from the acquisition unit 22, the wireless communication unit 14 transmits report information X indicating the measurement result, to the terminal device 112 or the like of the administrator, thereby notifying the administrator of the occurrence of the abnormality.

When a predetermined time period t1 has elapsed from, for example, the timing at which the notification of the measurement result has been made to the wireless communication unit 14, the determination detection unit 21 outputs, to the switch SW, a control signal for switching the switch SW to OFF. Accordingly, the wireless communication unit 14 stops operation again. As for the predetermined time period t1, a value greater than the time period from the timing at which the acquisition unit 22 has notified the wireless communication unit 14 of the measurement result to the timing of completion of the transmission of the report information X by the wireless communication unit 14 is set, for example.

In addition, when the predetermined time period t1 has elapsed from, for example, the timing at which the notification of the measurement result has been made to the wireless communication unit 14, the determination detection unit 21 causes the controller 13 to shift to the sleep mode again. Accordingly, the acquisition unit 22 stops operation again.

It should be noted that the determination unit 11 and the controller 13 in the wireless communication device 101 may be realized by a semiconductor integrated circuit such as the same CPU, DSP, or the like.

In this case, the determination unit 11 and the controller 13 are realized by different cores in a single CPU, DSP, or the like, for example. The core that functions as the determination unit 11 always operates, and the core that functions as the controller 13 can be switched between the sleep mode and the active mode.

The controller 13 may be configured so as not to include the acquisition unit 22.

In this case, when the determination detection unit 21 in the controller 13 has received an interrupt signal from the determination unit 11, the determination detection unit 21 outputs, to the switch SW, a control signal for switching the switch SW from OFF to ON, thereby activating the wireless communication unit 14 of which operation has been stopped. In addition, the determination detection unit 21 notifies the wireless communication unit 14 of the determination result by the determination unit 11, i.e., the determination result indicating that the measurement result by the sensor 151 satisfies the predetermined condition.

When the wireless communication unit 14 has been notified of the determination result from the determination detection unit 21, the wireless communication unit 14 transmits information indicating the determination result, to the terminal device 112 or the like of the administrator, thereby notifying the administrator of the occurrence of the abnormality.

Flow of Operation

Next, the flow of operation performed by the wireless communication device 101 according to the first embodiment of the present disclosure is described.

Each device in the communication system 201 includes a computer. An arithmetic processing unit such as a CPU in the computer reads out a program including part or all of steps in the following flow chart from a memory (not shown), and executes the program. Each of the programs for the plurality of devices can be installed from outside. Each of the programs for the plurality of devices is distributed in a state of being stored in a storage medium.

Interrupt Signal Output Process

Figure 3:
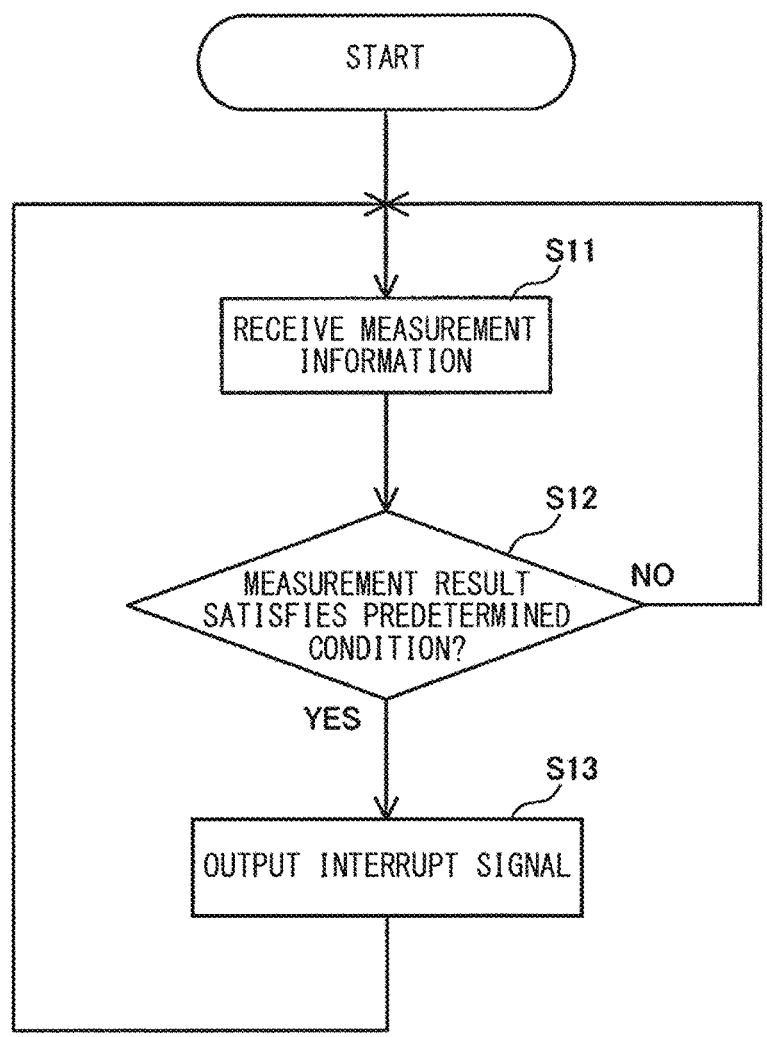
FIG. 3 is a flow chart describing the flow of operation of an interrupt signal output process performed by a determination unit in the wireless communication device according to the first embodiment of the present disclosure.

FIG. 3 is a flow chart describing the flow of operation of an interrupt signal output process performed by the determination unit in the wireless communication device according to the first embodiment of the present disclosure.

With reference to FIG. 3, first, when the power source of the wireless communication device 101 is turned on, and the determination unit 11 in the wireless communication device 101 has received measurement information transmitted from the sensor 151 (step S11), the determination unit 11 determines whether or not the measurement result indicated by the received measurement information satisfies a predetermined condition (step S12).

Next, when the determination unit 11 has determined that the measurement result satisfies the predetermined condition ("YES" in step S12), the determination unit 11 outputs, as the determination result, an interrupt signal to the controller 13 (step S13), and waits until measurement information is received from the sensor 151 again (step S11).

Meanwhile, when the determination unit 11 has determined that the measurement result does not satisfy the predetermined condition ("NO" in step S12), the determination unit 11 does not output an interrupt signal to the controller 13 and waits until measurement information is received from the sensor 151 again (step S11).

Abnormality Occurrence Notification Process

Figure 4:
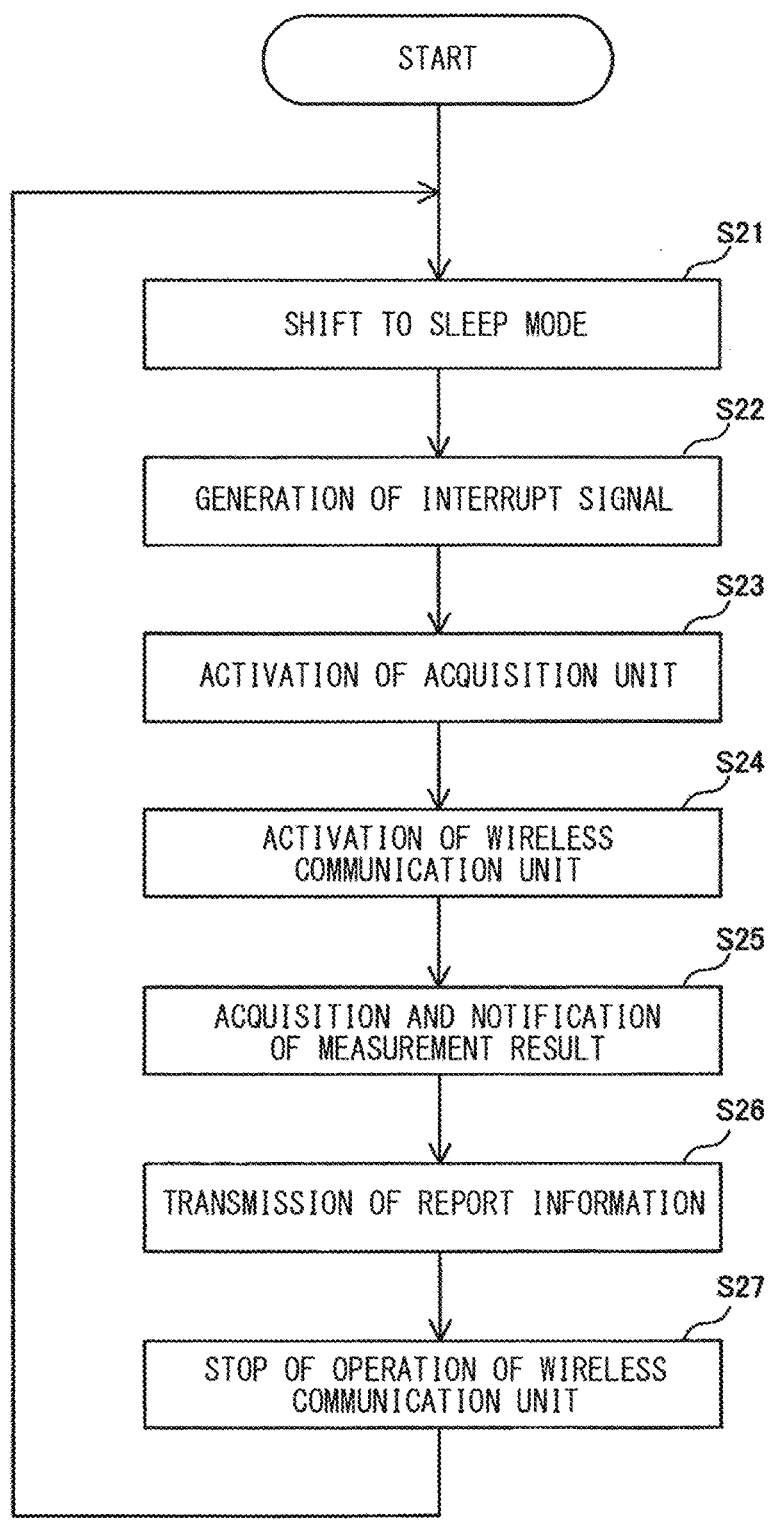
FIG. 4 is a flow chart describing the flow of operation of an abnormality occurrence notification process performed by a controller and a wireless communication unit in the wireless communication device according to the first embodiment of the present disclosure.

FIG. 4 is a flow chart describing the flow of operation of an abnormality occurrence notification process performed by the controller and the wireless communication unit in the wireless communication device according to the first embodiment of the present disclosure.

With reference to FIG. 4, first, when the power source of the wireless communication device 101 is turned on, the controller 13 shifts to the sleep mode as the initial state (step S21).

Next, when an interrupt signal has been generated (step S22), the determination detection unit 21 in the controller 13 causes the controller 13 to shift from the sleep mode to the active mode, thereby activating the acquisition unit 22 of which operation has been stopped (step S23).

Next, the determination detection unit 21 outputs a control signal to the switch SW, thereby switching the switch SW from OFF to ON. Accordingly, the wireless communication unit 14 of which operation has been stopped is activated (step S24).

Next, the acquisition unit 22 requests the determination unit 11 for notification of the measurement result having been determined as satisfying the predetermined condition, and is notified of the measurement result from the determination unit 11. Then, the acquisition unit 22 notifies the wireless communication unit 14 of the measurement result (step S25).

Next, when the wireless communication unit 14 has been notified of the measurement result from the acquisition unit 22, the wireless communication unit 14 transmits report information X indicating the measurement result, to the terminal device 112 or the like, thereby making notification of the occurrence of the abnormality (step S26).

Next, when the predetermined time period t1 has elapsed from, for example, the timing at which the acquisition unit 22 has notified the wireless communication unit 14 of the measurement result, the determination detection unit 21 outputs, to the switch SW, a control signal for switching the switch SW to OFF, thereby stopping the operation of the wireless communication unit 14 (step S27), and the controller 13 shifts to the sleep mode again (step S21).

Meanwhile, according to the device as in PATENT LITERATURE 1 described above, an abnormality that has occurred in a facility can be detected, without using manpower. If such a device performs wired communication using a LAN (Local Area Network) cable, for example, reconfiguration of production lines in a plant is required, which could require costs. Therefore, a device that can perform wireless communication is desirable. Further, for similar reasons, a battery-operated-type device that requires no power source line is desirable.

However, if abnormality detection is always performed, power consumption is increased. Thus, it is conceivable to provide a standby time for the device in order to extend the life of the battery. However, in this case, there is a possibility that an instantaneous change in the state of the measurement target cannot be detected.

Specifically, there are cases where an abnormality of a measurement target object is detected by measuring the current flowing in the measurement target object or vibration of the measurement target object. Also, for example, there are cases where a method is employed in which an abnormality such as a failure of a measurement target object is previously predicted by detecting an instantaneous peak value of the current or an instantaneous peak value of acceleration.

However, in a case where such a method is used, if a standby time is provided for the device, there is a possibility that an instantaneous peak value of the current, acceleration, or the like cannot be detected.

In contrast, in the wireless communication device 101 according to the first embodiment of the present disclosure, the operation of the wireless communication unit 14 can be activated and stopped. In addition, the determination unit 11 determines whether or not the measurement result of the sensor 151 satisfies a predetermined condition. In addition, when the determination unit 11 has determined that the measurement result satisfies the predetermined condition, the controller 13 performs control of activating the wireless communication unit 14 of which operation has been stopped, and causing the wireless communication unit 14 to transmit the measurement result or the determination result by the determination unit 11.

According to this configuration, the operation of the wireless communication unit 14 can be stopped until the measurement result satisfies the predetermined condition. Thus, power consumption can be suppressed and the life of the battery 15 can be extended. Since the function of determining whether or not the measurement result satisfies the predetermined condition is always operated, a change that has occurred in the measurement target object 110 can be detected also in a state where the operation of the wireless communication unit 14 is stopped. Therefore, power consumption can be suppressed and an instantaneous change in the measurement target object 110 can be detected.

In the wireless communication device 101 according to the first embodiment of the present disclosure, the controller 13 includes the determination detection unit 21 which receives an interrupt signal as a determination result from the determination unit 11, and the acquisition unit 22 of which operation is allowed to be activated and stopped. When the determination detection unit 21 has received an interrupt signal indicating that the predetermined condition has been satisfied, the acquisition unit 22 of which operation has been stopped is activated and acquires the measurement result.

According to this configuration, also inside the controller 13, the function for acquiring the measurement result can be stopped until the measurement result satisfies the predetermined condition, and thus, power consumption can be further suppressed.

In the wireless communication device 101 according to the first embodiment of the present disclosure, the wireless communication unit 14, the determination unit 11, and the controller 13 operate by being supplied with power from the battery 15.

This configuration requires no power source line, and thus, when the wireless communication device 101 is to be installed in a plant or the like, reconfiguration or the like of production lines can be avoided.

Next, other embodiments of the present disclosure will be described with reference to the drawings. In the drawings, the same or corresponding parts are denoted by the same reference signs, and will not be repeatedly described.

Second Embodiment

Configuration and Basic Operation

In the communication system 201 according to the first embodiment of the present disclosure described above, the wireless communication device 101 transmits report information X when having detected occurrence of an abnormality in the measurement target object 110.

In contrast, in the communication system 201 according to a second embodiment of the present disclosure, a wireless communication device 102 further performs periodic information transmission, in addition to transmission of report information X performed when occurrence of an abnormality in the measurement target object 110 has been detected.

Figure 5:
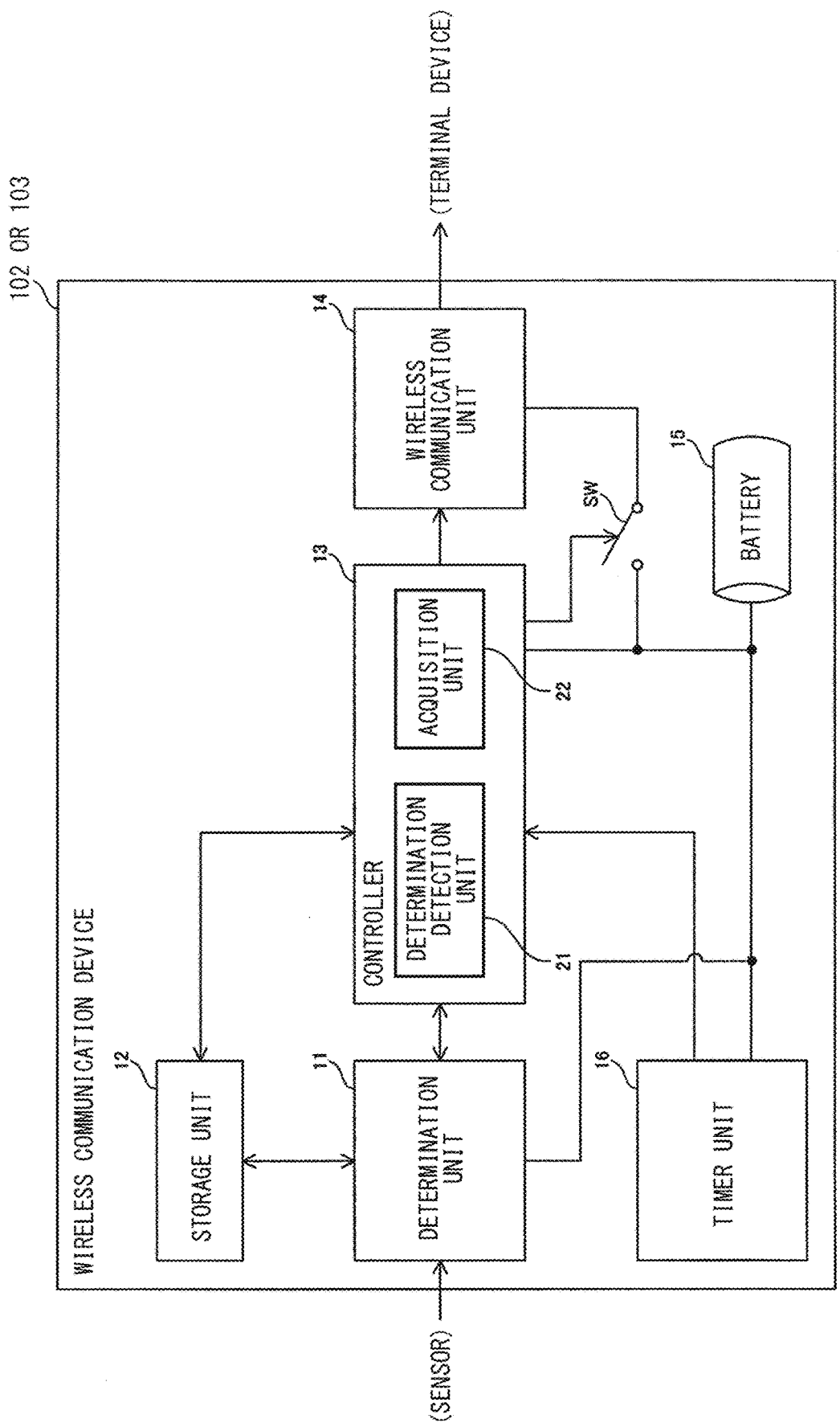
FIG. 5 is a diagram showing a configuration of a wireless communication device according to a second embodiment of the present disclosure.

FIG. 5 is a diagram showing a configuration of a wireless communication device according to the second embodiment of the present disclosure.

With reference to FIG. 5, the wireless communication device 102 further includes a timer unit 16, in addition to the determination unit 11, the storage unit 12, the controller 13, the wireless communication unit 14, the battery 15, and the switch SW.

In a state where the power source of the wireless communication device 102 is ON, the timer unit 16 always operates by being supplied with power from the battery 15, and outputs an interrupt signal to the controller 13 at a predetermined time interval.

When the determination detection unit 21 in the controller 13 has received an interrupt signal from the determination unit 11 or the timer unit 16, the determination detection unit 21 confirms whether the interrupt signal is a signal outputted from the determination unit 11 or a signal outputted from the timer unit 16. When the interrupt signal is a signal outputted from the timer unit 16, the determination detection unit 21 causes the sleep mode of the controller 13 to be continued.

In this case, the determination detection unit 21 performs control of causing data of a fixed value FV to be transmitted from the wireless communication unit 14.

More specifically, the determination detection unit 21 outputs, to the switch SW, a control signal for switching the switch SW from OFF to ON, thereby activating the wireless communication unit 14 of which operation has been stopped.

The storage unit 12 has stored therein a fixed value FV previously set by the administrator, for example. The determination detection unit 21 reads out the fixed value FV stored in the storage unit 12, and notifies the wireless communication unit 14 of the read out fixed value FV.

The wireless communication unit 14 transmits, to the terminal device 112 or the like of the administrator, fixed information Y indicating the fixed value FV having been notified of from the determination detection unit 21.

Meanwhile, when the acquired interrupt signal is a signal outputted from the determination unit 11, the determination detection unit 21 causes the controller 13 to shift from the sleep mode to the active mode. Then, the controller 13 performs control of causing report information X to be transmitted from the wireless communication unit 14.

The operation of the control performed by the controller 13 is similar to the operation performed by the controller 13 in the wireless communication device 101 according to the first embodiment of the present disclosure described above, and thus, detailed description thereof is not repeated here.

Figure 6:
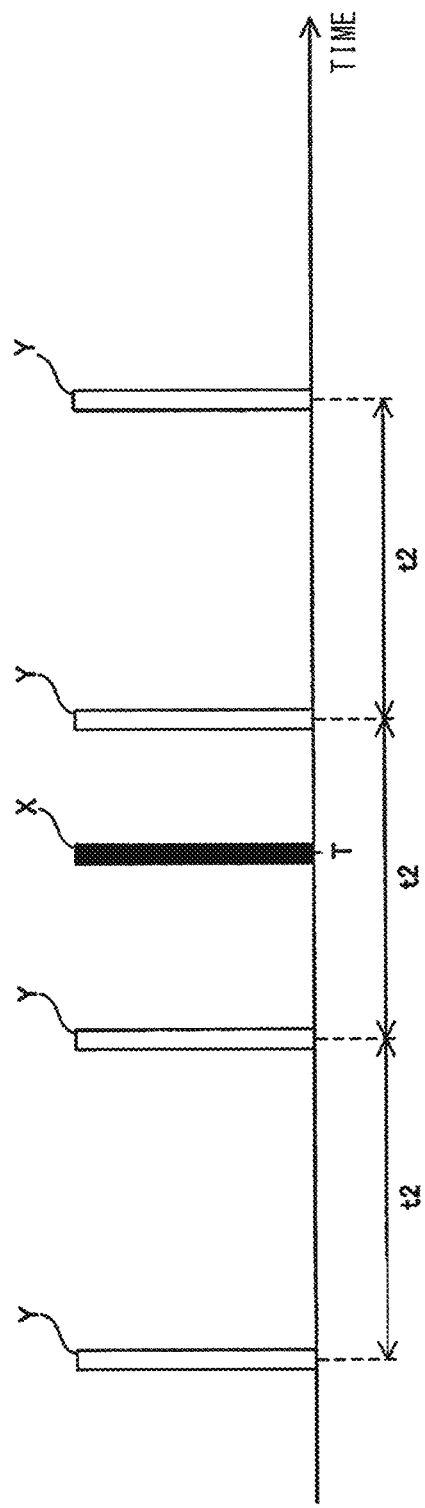
FIG. 6 is a diagram for describing transmission timings of report information and fixed information from the wireless communication device according to the second embodiment of the present disclosure.

FIG. 6 is a diagram for describing transmission timings of report information and fixed information from the wireless communication device according to the second embodiment of the present disclosure.

With reference to FIG. 6, at a time T, for example, if an abnormality that has occurred in the measurement target object 110 has been detected, i.e., if a measurement result has been determined as satisfying a predetermined condition, the wireless communication unit 14 transmits report information X indicating the measurement result.

When the timer unit 16 outputs an interrupt signal at an interval of a time period t2, for example, the wireless communication unit 14 transmits, fixed information Y indicating the fixed value FV, at the interval of the time period t2.

Flow of Operation

Next, the flow of operation performed by the wireless communication device 102 according to the second embodiment of the present disclosure is described.

Figure 7:
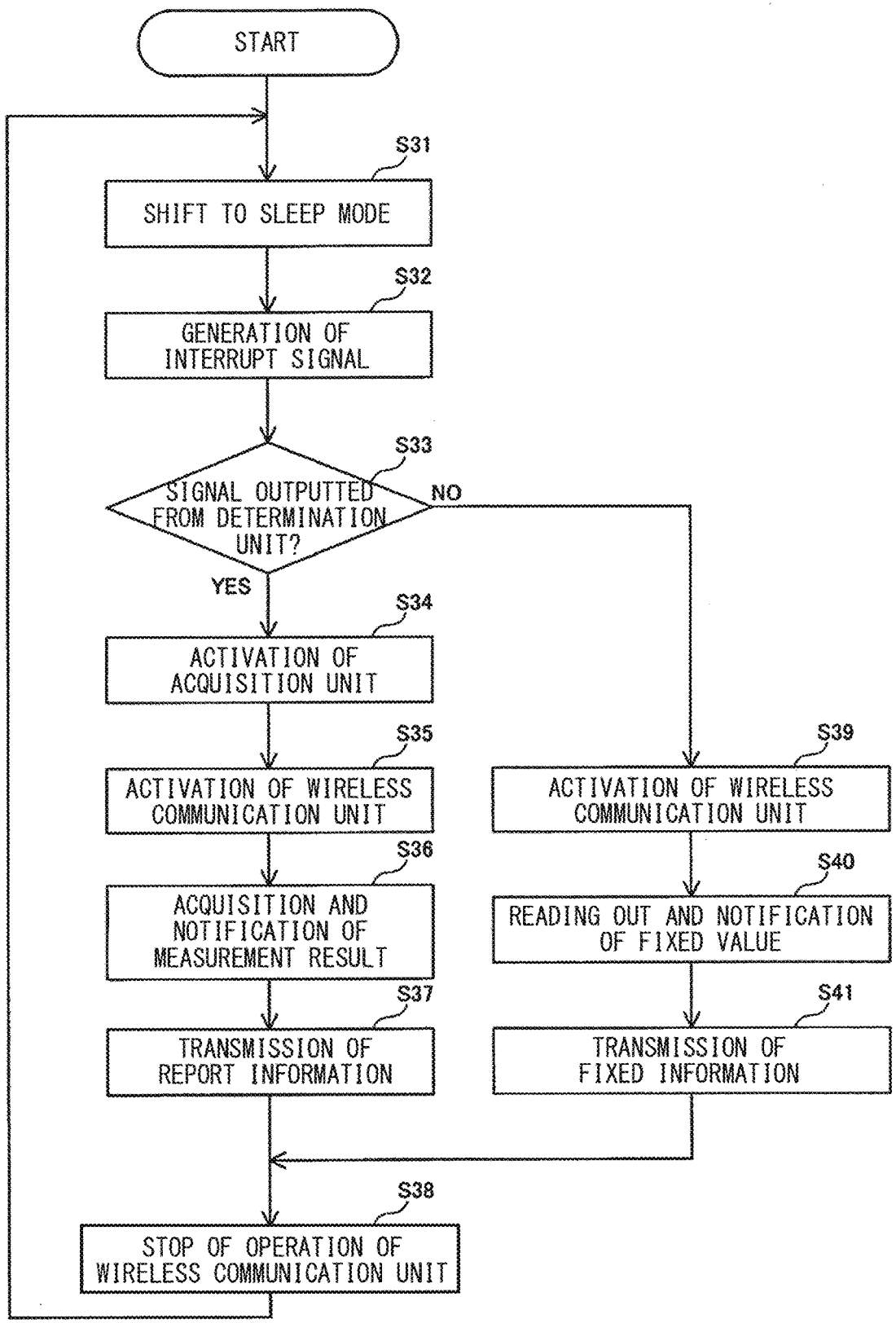
FIG. 7 is a flow chart describing the flow of operation of a transmission process of report information or fixed information performed by a controller and a wireless communication unit in the wireless communication device according to the second embodiment of the present disclosure.

FIG. 7 is a flow chart describing the flow of operation of a transmission process of report information or fixed information performed by the controller and the wireless communication unit in the wireless communication device according to the second embodiment of the present disclosure.

With reference to FIG. 7, first, when the power source of the wireless communication device 102 is turned on, the controller 13 shifts to the sleep mode as the initial state (step S31).

Next, when an interrupt signal has been generated (step S32), the determination detection unit 21 in the controller 13 confirms whether or not the interrupt signal is a signal outputted from the determination unit 11, for example (step S33).

Next, when the acquired interrupt signal is a signal outputted from the determination unit 11 ("YES" in step S33), the determination detection unit 21 causes the controller 13 to shift from the sleep mode to the active mode, thereby activating the acquisition unit 22 of which operation has been stopped (step S34).

Next, the determination detection unit 21 outputs a control signal to the switch SW, thereby switching the switch SW from OFF to ON. Accordingly, the wireless communication unit 14 of which operation has been stopped is activated (step S35).

Next, the acquisition unit 22 requests the determination unit 11 for notification of the measurement result having been determined as satisfying the predetermined condition, and is notified of the measurement result from the determination unit 11. Then, the acquisition unit 22 notifies the wireless communication unit 14 of the measurement result (step S36).

Next, when the wireless communication unit 14 has been notified of the measurement result from the acquisition unit 22, the wireless communication unit 14 transmits report information X indicating the measurement result, to the terminal device 112 or the like, thereby making notification of the occurrence of the abnormality (step S37).

Next, when the predetermined time period t1 has elapsed from, for example, the timing at which the acquisition unit 22 has notified the wireless communication unit 14 of the measurement result, the determination detection unit 21 outputs, to the switch SW, a control signal for switching the switch SW to OFF, thereby stopping the operation of the wireless communication unit 14 (step S38), and the controller 13 shifts to the sleep mode again (step S31).

Meanwhile, when the interrupt signal generated in step S32 is not a signal outputted from the determination unit 11 ("NO" in step S33), the determination detection unit 21 outputs a control signal to the switch SW, thereby switching the switch SW from OFF to ON. Accordingly, the wireless communication unit 14 of which operation has been stopped is activated (step S39).

Next, the determination detection unit 21 reads out the fixed value FV stored in the storage unit 12, and notifies the wireless communication unit 14 of the read out fixed value FV (step S40).

Next, the wireless communication unit 14 transmits, to the terminal device 112 or the like, fixed information Y indicating the fixed value FV having been notified of from the determination detection unit 21 (step S41).

Next, when the predetermined time period t1 has elapsed from, for example, the timing at which the acquisition unit 22 has notified the wireless communication unit 14 of the measurement result, the determination detection unit 21 outputs, to the switch SW, a control signal for switching the switch SW to OFF, thereby stopping the operation of the wireless communication unit 14 (step S38), and the controller 13 shifts to the sleep mode again (step S31).

As described above, in the wireless communication device 102 according to the second embodiment of the present disclosure, the controller 13 further performs control of periodically activating the wireless communication unit 14 of which operation has been stopped, and causing the wireless communication unit 14 to transmit information.

According to this configuration, for example, even in a case where report information X indicating a measurement result is not transmitted for a long period because no abnormality occurs in the measurement target object 110, whether or not the wireless communication device 101 is operating normally can be confirmed by the administrator or the like periodically receiving the information.

In the wireless communication device 102 according to the second embodiment of the present disclosure, the information periodically transmitted from the wireless communication unit 14 is fixed information Y indicating the fixed value FV.

According to this configuration, until the measurement result satisfies the predetermined condition, the function for acquiring the measurement result, i.e., the operation of the acquisition unit 22, can be stopped. Therefore, while enabling confirmation on whether or not the wireless communication device 101 is operating normally, it is possible to suppress increase in power consumption.

Modification of the Second Embodiment

The wireless communication device 102 may be configured to transmit, instead of the fixed information Y, report information X indicating the most recent measurement result obtained by the sensor 151, to the terminal device 112 or the like.

More specifically, when the determination detection unit 21 has received an interrupt signal, in each case where the output source of the interrupt signal is the determination unit 11 or the timer unit 16, for example, the determination detection unit 21 activates the acquisition unit 22 and activates the wireless communication unit 14.

Then, the acquisition unit 22 requests the determination unit 11 for notification of the most recent measurement result, and is notified of the measurement result from the determination unit 11. Then, the acquisition unit 22 notifies the wireless communication unit 14 of the measurement result. When the wireless communication unit 14 has been notified of the measurement result from the acquisition unit 22, the wireless communication unit 14 transmits, to the terminal device 112 or the like, report information X indicating the measurement result.

That is, irrespective of whether or not the most recent measurement result satisfies the predetermined condition, the wireless communication unit 14 transmits report information X indicating the measurement result, at a predetermined time interval. In addition, at the time T, for example, if an abnormality that has occurred in the measurement target object 110 has been detected, the wireless communication unit 14 further performs transmission of report information X that indicates occurrence of an abnormality, in addition to transmission of report information X at a predetermined time interval.

As described above, in the wireless communication device 102 according to the modification of the second embodiment of the present disclosure, information periodically transmitted from the wireless communication unit 14 is report information X that indicates the most recent measurement result.

According to this configuration, while enabling confirmation on whether or not the wireless communication device 101 is operating normally, it is possible for the administrator or the like to periodically confirm the state of the measurement target object 110.

Other configurations and operations are similar to those of the first embodiment, and thus, detailed description thereof is not repeated here.

Third Embodiment

Configuration and Basic Operation

In the communication system 201 according to the second embodiment of the present disclosure described above, the wireless communication device 102 further performs periodic information transmission, in addition to transmission of report information X performed when occurrence of an abnormality in the measurement target object 110 has been detected.

In contrast, in the communication system 201 according to a third embodiment of the present disclosure, when an abnormality having occurred in the measurement target object 110 has been detected, the wireless communication device 103 performs transmission of report information X indicating occurrence of an abnormality and periodic information transmission, and further performs retransmission of the report information X indicating the occurrence of the abnormality.

With reference to FIG. 5 again, similar to the wireless communication device 102 according to the second embodiment of the present disclosure described above, the wireless communication device 103 according to the third embodiment of the present disclosure includes the determination unit 11, the storage unit 12, the controller 13, the wireless communication unit 14, the battery 15, the timer unit 16, and the switch SW.

In a state where the power source of the wireless communication device 103 is ON, the timer unit 16 always operates by being supplied with power from the battery 15, and outputs an interrupt signal to the controller 13 at a predetermined time interval.

When the determination detection unit 21 has received an interrupt signal from the determination unit 11 or the timer unit 16, the determination detection unit 21 causes the controller 13 to shift from the sleep mode to the active mode, thereby activating the acquisition unit 22. In addition, the determination detection unit 21 outputs, to the switch SW, a control signal for switching the switch SW from OFF to ON, thereby activating the wireless communication unit 14 of which operation has been stopped.

The determination detection unit 21 confirms whether the received interrupt signal is a signal outputted from the determination unit 11 or a signal outputted from the timer unit 16, and notifies the acquisition unit 22 of the confirmation result.

When the acquisition unit 22 has been notified, by the determination detection unit 21, of a confirmation result indicating that the output source of the interrupt signal is the determination unit 11, the acquisition unit 22 requests the determination unit 11 for notification of the most recent measurement result, i.e., the measurement result having been determined as satisfying the predetermined condition. Then, when the acquisition unit 22 has been notified of the measurement result from the determination unit 11, the acquisition unit 22 notifies the wireless communication unit 14 of the measurement result.

When the wireless communication unit 14 has been notified of the measurement result from the acquisition unit 22, the wireless communication unit 14 transmits, to the terminal device 112 or the like of the administrator, report information X indicating the measurement result, thereby notifying the administrator of the occurrence of the abnormality.

In this case, the acquisition unit 22 adds an identifier to the latest measurement result notified of from the determination unit 11 and stores the measurement result in the storage unit 12, for example.

Meanwhile, when the acquisition unit 22 has been notified, by the determination detection unit 21, of a confirmation result indicating that the transmission source of the interrupt signal is the timer unit 16, the acquisition unit 22 confirms whether or not a measurement result that has an identifier added thereto is stored in the storage unit 12. When the acquisition unit 22 has confirmed that a measurement result that has an identifier added thereto is stored in the storage unit 12, the acquisition unit 22 reads out the measurement result that has the identifier added thereto.

In addition, the acquisition unit 22 requests the determination unit 11 for notification of the most recent measurement result. When the acquisition unit 22 has been notified of the measurement result from the determination unit 11, the acquisition unit 22 notifies the wireless communication unit 14 of the measurement result.

When the wireless communication unit 14 has been notified of the measurement result having the identifier added thereto and the most recent measurement result from the acquisition unit 22, the wireless communication unit 14 transmits, to the terminal device 112 or the like of the administrator, report information X that indicates the measurement result having the identifier added thereto and the most recent measurement result.

Hereinafter, report information X that indicates the most recent measurement result is also referred to as "report information X1", report information X that indicates the measurement result having the identifier added thereto is also referred to as "report information X2", and report information X that indicates the most recent measurement result and the measurement result having the identifier added thereto is also referred to as "report information X3".

Figure 8:
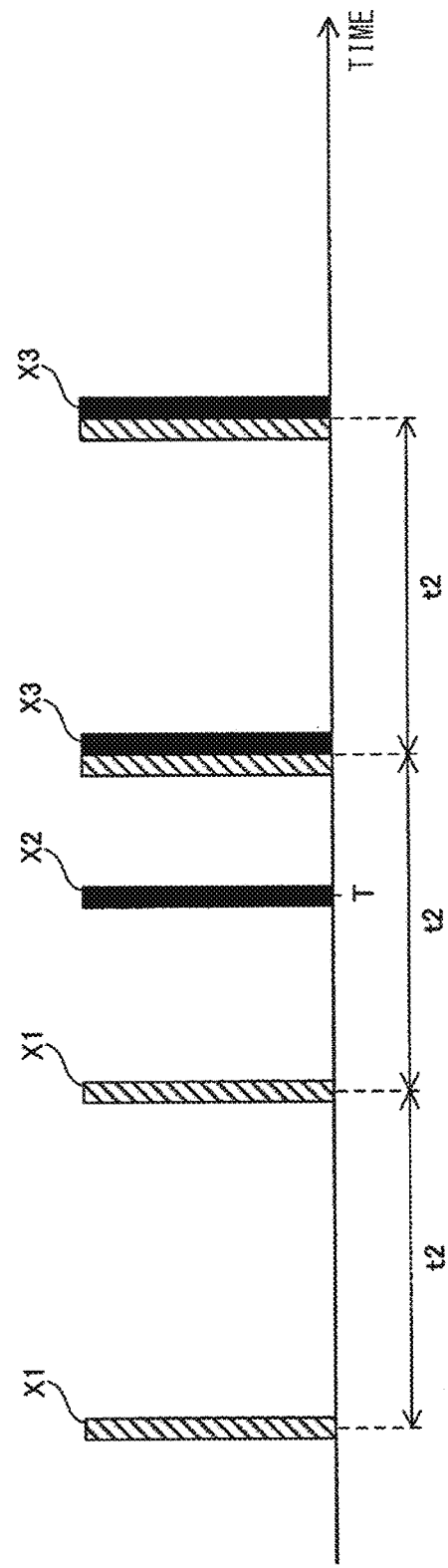
FIG. 8 is a diagram for describing information to be transmitted from a wireless communication device according to a third embodiment of the present disclosure.

FIG. 8 is a diagram for describing information to be transmitted from the wireless communication device according to the third embodiment of the present disclosure.

With reference to FIG. 8, it is assumed that an abnormality that has occurred in the measurement target object 110 has been detected at the time T. It is also assumed that the timer unit 16 outputs an interrupt signal at an interval of the time period t2. In this case, in the period before the time T, the wireless communication unit 14 transmits the report information X1 indicating the most recent measurement result, at an interval of the time period t2. Then, at the time T, the wireless communication unit 14 transmits the report information X2 indicating the measurement result having been determined as satisfying the predetermined condition. At this time, the measurement result is stored, with an identifier added thereto.

After the time T, the wireless communication unit 14 transmits, at the interval of the time period t2, the report information X3 indicating the measurement result having the identifier added thereto and the most recent measurement result.

The wireless communication device 103 may be configured to transmit fixed information Y indicating the fixed value FV, instead of transmitting the report information X1 indicating the most recent measurement result. In this case, after the time T at which an abnormality having occurred in the measurement target object 110 has been detected, the wireless communication device 103 transmits fixed information Y and the report information X2 indicating the occurrence of the abnormality, at an interval of the time period t2.

Flow of Operation

Next, the flow of operation performed by the wireless communication device 103 according to the third embodiment of the present disclosure is described.

Figure 9:
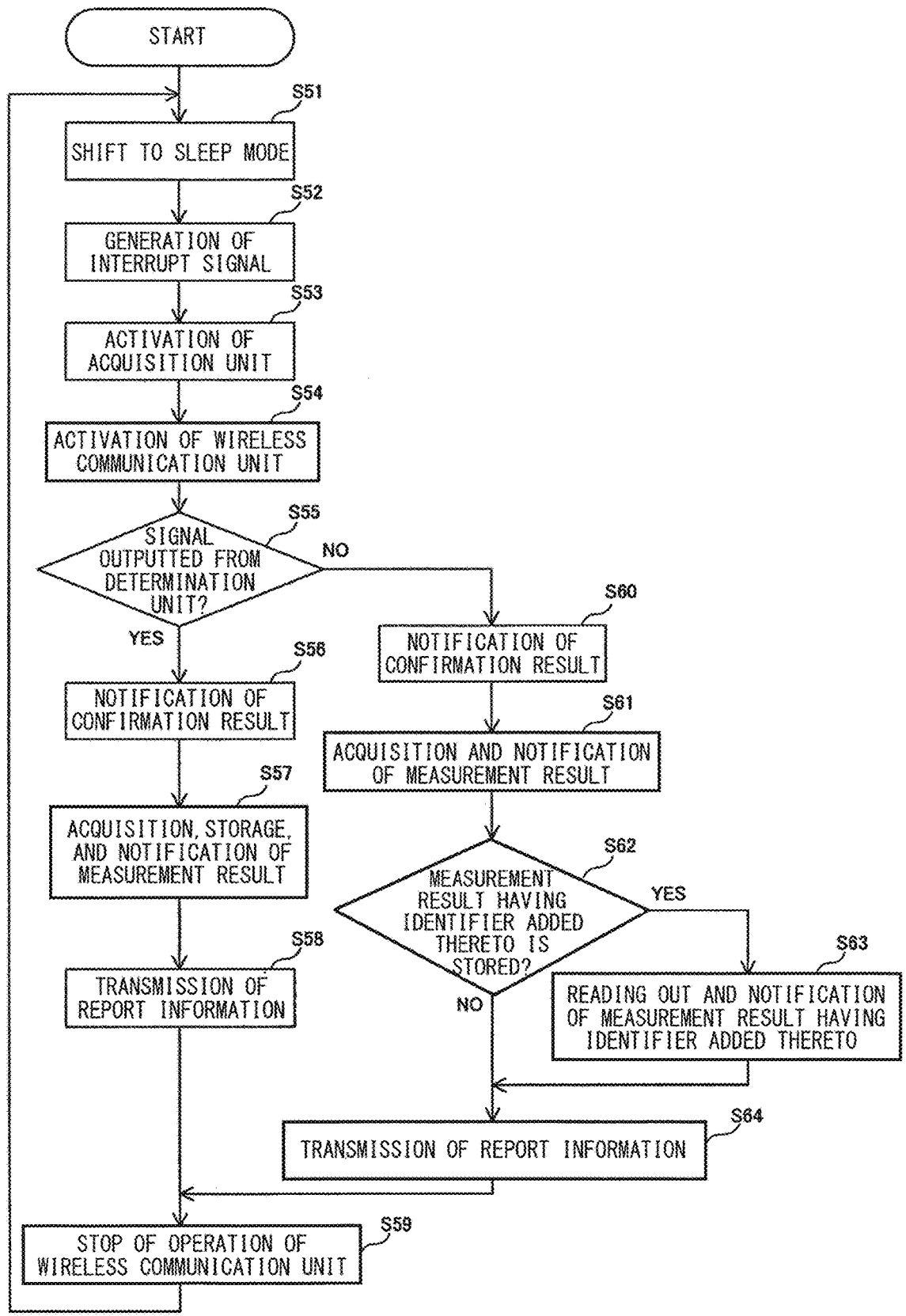
FIG. 9 is a flow chart describing the flow of operation of a transmission process of report information performed by a controller and a wireless communication unit in the wireless communication device according to the third embodiment of the present disclosure.

FIG. 9 is a flow chart describing the flow of operation of a transmission process of report information performed by the controller and the wireless communication unit in the wireless communication device according to the third embodiment of the present disclosure.

With reference to FIG. 9, first, when the power source of the wireless communication device 103 is turned on, the controller 13 shifts to the sleep mode as the initial state (step S51).

Next, when an interrupt signal has been generated (step S52), the determination detection unit 21 in the controller 13 causes the controller 13 to shift from the sleep mode to the active mode, thereby activating the acquisition unit 22 of which operation has been stopped (step S53).

Next, the determination detection unit 21 outputs a control signal to the switch SW, thereby switching the switch SW from OFF to ON. Accordingly, the wireless communication unit 14 of which operation has been stopped is activated (step S54).

Next, the determination detection unit 21 confirms whether or not the interrupt signal acquired in step S52 is a signal outputted from the determination unit 11 (step S55).

When the acquired interrupt signal is a signal outputted from the determination unit 11 ("YES" in step S55), the determination detection unit 21 notifies the acquisition unit 22 of the confirmation result (step S56).

Next, when the acquisition unit 22 has been notified of the confirmation result, the acquisition unit 22 requests the determination unit 11 for notification of the measurement result having been determined as satisfying the predetermined condition, and is notified of the measurement result from the determination unit 11. Then, the acquisition unit 22 adds an identifier to the notified measurement result, and stores the measurement result in the storage unit 12. In addition, the acquisition unit 22 notifies the wireless communication unit 14 of the measurement result (step S57).

Next, when the wireless communication unit 14 has been notified of the measurement result from the acquisition unit 22, the wireless communication unit 14 transmits the report information X2 indicating the measurement result, to the terminal device 112 or the like (step S58).

Next, when the predetermined time period t1 has elapsed from, for example, the timing at which the acquisition unit 22 has notified the wireless communication unit 14 of the measurement result, the determination detection unit 21 outputs, to the switch SW, a control signal for switching the switch SW to OFF, thereby stopping the operation of the wireless communication unit 14 (step S59), and the controller 13 shifts to the sleep mode again (step S51).

Meanwhile, when the interrupt signal acquired in step S52 is not a signal outputted from the determination unit 11 ("NO" in step S55), the determination detection unit 21 notifies the acquisition unit 22 of the confirmation result (step S60).

Next, when the acquisition unit 22 has been notified of the confirmation result, the acquisition unit 22 requests the determination unit 11 of the most recent measurement result, and is notified of the measurement result from the determination unit 11. Then, the acquisition unit 22 notifies the wireless communication unit 14 of the measurement result (step S61).

Next, the acquisition unit 22 confirms whether or not a measurement result having an identifier added thereto is stored in the storage unit 12 (step S62).

When a measurement result having an identifier added thereto is stored in the storage unit 12 ("YES" in step S62), the acquisition unit 22 reads out the measurement result having the identifier added thereto, and notifies the wireless communication unit 14 of the read out measurement result (step S63).

Next, the wireless communication unit 14 transmits, to the terminal device 112 or the like, the report information X3 which indicates the most recent measurement result notified of in step S61, and the measurement result having the identifier added thereto and having been notified of in step S63 (step S64).

Next, when the predetermined time period t1 has elapsed from, for example, the timing at which the acquisition unit 22 has notified the wireless communication unit 14 of the measurement result, the determination detection unit 21 outputs, to the switch SW, a control signal for switching the switch SW to OFF, thereby stopping the operation of the wireless communication unit 14 (step S59), and the controller 13 shifts to the sleep mode again (step S51).

Meanwhile, when a measurement result having an identifier added thereto is not stored in the storage unit 12 ("NO" in step S62), the acquisition unit 22 does not read out any measurement result, and the wireless communication unit 14 transmits, to the terminal device 112 or the like, the report information X1 indicating the most recent measurement result notified of in step S61 (step S64).

Next, when the predetermined time period t1 has elapsed from, for example, the timing at which the acquisition unit 22 has notified the wireless communication unit 14 of the measurement result, the determination detection unit 21 outputs, to the switch SW, a control signal for switching the switch SW to OFF, thereby stopping the operation of the wireless communication unit 14 (step S59), and the controller 13 shifts to the sleep mode again (step S51).

As described above, in the wireless communication device 103 according to the third embodiment of the present disclosure, the information periodically transmitted from the wireless communication unit 14 is the report information X indicating the measurement result that has satisfied the predetermined condition.

According to this configuration, the measurement result that has satisfied the predetermined condition is repeatedly transmitted. Therefore, while enabling confirmation on whether or not the wireless communication device 101 is operating normally, it is possible to more assuredly perform notification of the measurement result that satisfies the predetermined condition.

Other configurations and operations are similar to those of the first embodiment and the second embodiment, and thus, detailed description thereof is not repeated here.

In each of the wireless communication devices according to the first embodiment, the second embodiment, and the third embodiment of the present disclosure, the controller 13 may be configured to operate in the active mode in the initial state. That is, the determination detection unit 21 and the acquisition unit 22 in the controller 13 may always operate in a state where the power source of the wireless communication device is ON.

Further, part or all of components and operation of the devices according to the first embodiment, the second embodiment, and the third embodiment of the present disclosure may be combined as appropriate.

The above embodiments are to be considered in all aspects illustrative and not restrictive. The scope of the present disclosure is indicated by the appended claims rather than by the above description, and all changes which come within the meaning and the range of equivalency of the claims are intended to be included therein.

The above description includes the feature in the additional note below.

Additional Note 1

A wireless communication device comprising:
a wireless communication unit of which operation is allowed to be activated and stopped;
a determination unit configured to determine whether or not a measurement result by a sensor satisfies a predetermined condition; and
a controller configured to perform control of, when the determination unit has determined that the predetermined condition has been satisfied, activating the wireless communication unit of which operation has been stopped, and causing the wireless communication unit to transmit the measurement result or a determination result by the determination unit, wherein
the wireless communication unit, the determination unit, and the controller operate by being supplied with power from a battery,
the sensor measures at least one of a value of a current flowing in a measurement target object, vibration of the measurement target object, and a temperature of the measurement target object, and
the controller performs control of periodically activating the wireless communication unit of which operation has been stopped, and causing the wireless communication unit to transmit a most recent measurement result, and after a timing at which the determination unit has determined that the predetermined condition has been satisfied, the controller performs control of causing the wireless communication unit to periodically transmit the measurement result that has satisfied the predetermined condition together with the most recent measurement result.

REFERENCE SIGNS LIST

11 determination unit
12 storage unit
13 controller
14 wireless communication unit
15 battery
16 timer unit
21 determination detection unit
22 acquisition unit
101, 102, 103 wireless communication device
110 measurement target object
112 terminal device
151 sensor
201 communication system

The invention claimed is:

1. A wireless communication device comprising:
a controller;
a wireless communication unit of which operation is activated and stopped by the controller;
a determination unit that determines whether a measurement result by a sensor satisfies a predetermined condition, and the determination unit outputs a first interrupt signal to the controller when the predetermined condition is determined to be satisfied; and
a timer that periodically outputs a second interrupt signal, which is different from the first interrupt signal, to the controller, wherein
the controller discriminates between the first interrupt signal from the determination unit and the second interrupt signal from the timer, when having received the first interrupt signal, the controller performs a first control of activating the wireless communication unit of which operation has been stopped, causing the wireless communication unit to transmit the measurement result or a determination result by the determination unit, and causing the wireless communication unit to stop after transmission of the measurement result or the determination result, and when having received the second interrupt signal, the controller performs a second control of activating the wireless communication unit of which operation has been stopped, causing the wireless communication unit to transmit information, and causing the wireless communication unit to stop after transmission of the information.

2. The wireless communication device according to claim 1, wherein the controller includes:
 a determination detection unit receives the determination result from the determination unit, and
 an acquisition unit of which operation is allowed to be activated and stopped, and
when the determination detection unit has received the determination result indicating that the predetermined condition has been satisfied, the acquisition unit of which operation has been stopped is activated and acquires the measurement result.

3. The wireless communication device according to claim 1, wherein
the information is the measurement result that has satisfied the predetermined condition.

4. The wireless communication device according to claim 1, wherein
the information is a most recent measurement result.

5. The wireless communication device according to claim 1, wherein
the information is data of a fixed value.

6. The wireless communication device according to claim 1, wherein
the wireless communication unit, the determination unit, and the controller each operate by being supplied with power from a battery.

7. A non-transitory computer readable storage medium storing a computer program to be used in a wireless communication device, the computer program causes a computer to function as:

a controller;

a wireless communication unit of which operation is activated and stopped by the controller;

a determination unit that determines whether a measurement result by a sensor satisfies a predetermined condition, and the determination unit outputs a first interrupt signal to the controller when the predetermined condition is determined to be satisfied; and a timer that periodically outputs a second interrupt signal, which is different from the first interrupt signal, to the controller, wherein the controller discriminates between the first interrupt signal from the determination unit and the second interrupt signal from the timer, when having received the first interrupt signal, the controller performs a first control of activating the wireless communication unit of which operation has been stopped, causing the wireless communication unit to transmit the measurement result or a determination result by the determination unit, and causing the wireless communication unit to stop after transmission of the measurement result or the determination result, and when having received the second interrupt signal, the controller performs a second control of activating the wireless communication unit of which operation has been stopped, causing the wireless communication unit to transmit information, and causing the wireless communication unit to stop after transmission of the information.

* * * * *